United States Patent Office 3,400,739
Patented Sept. 10, 1968

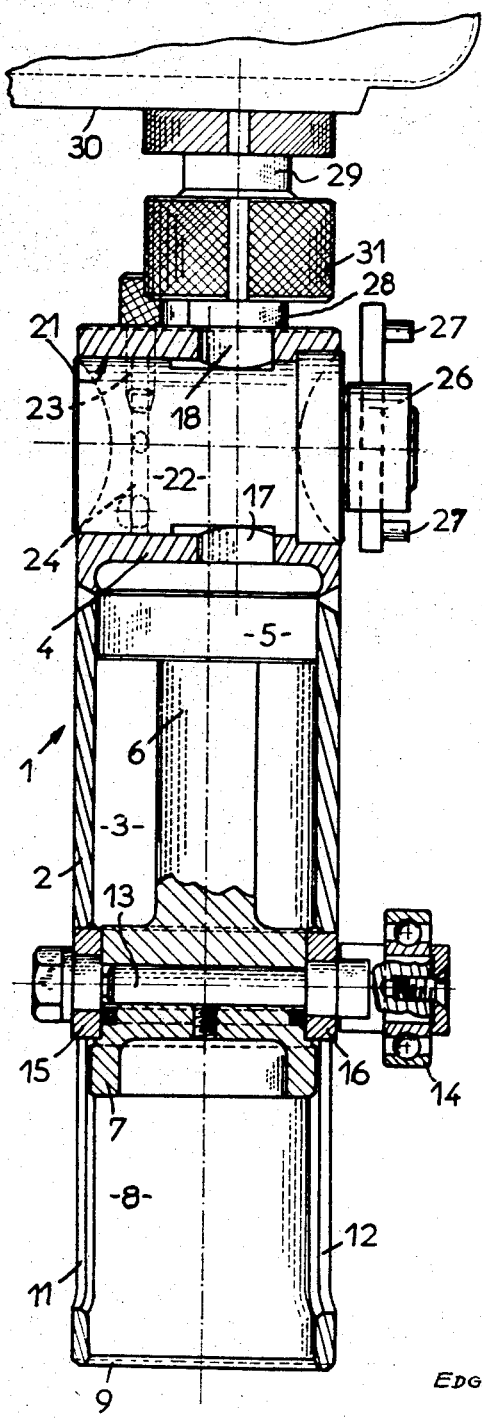

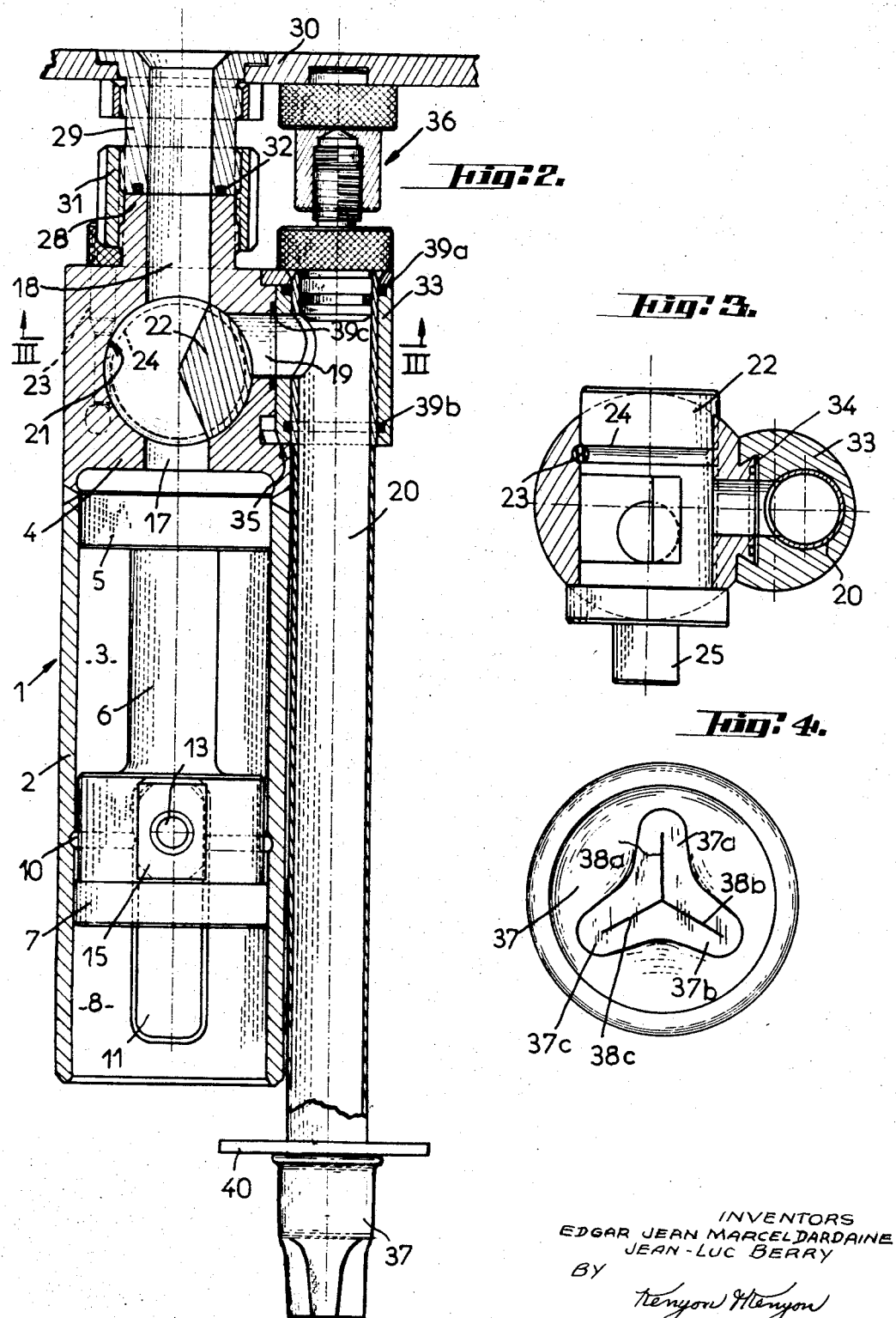

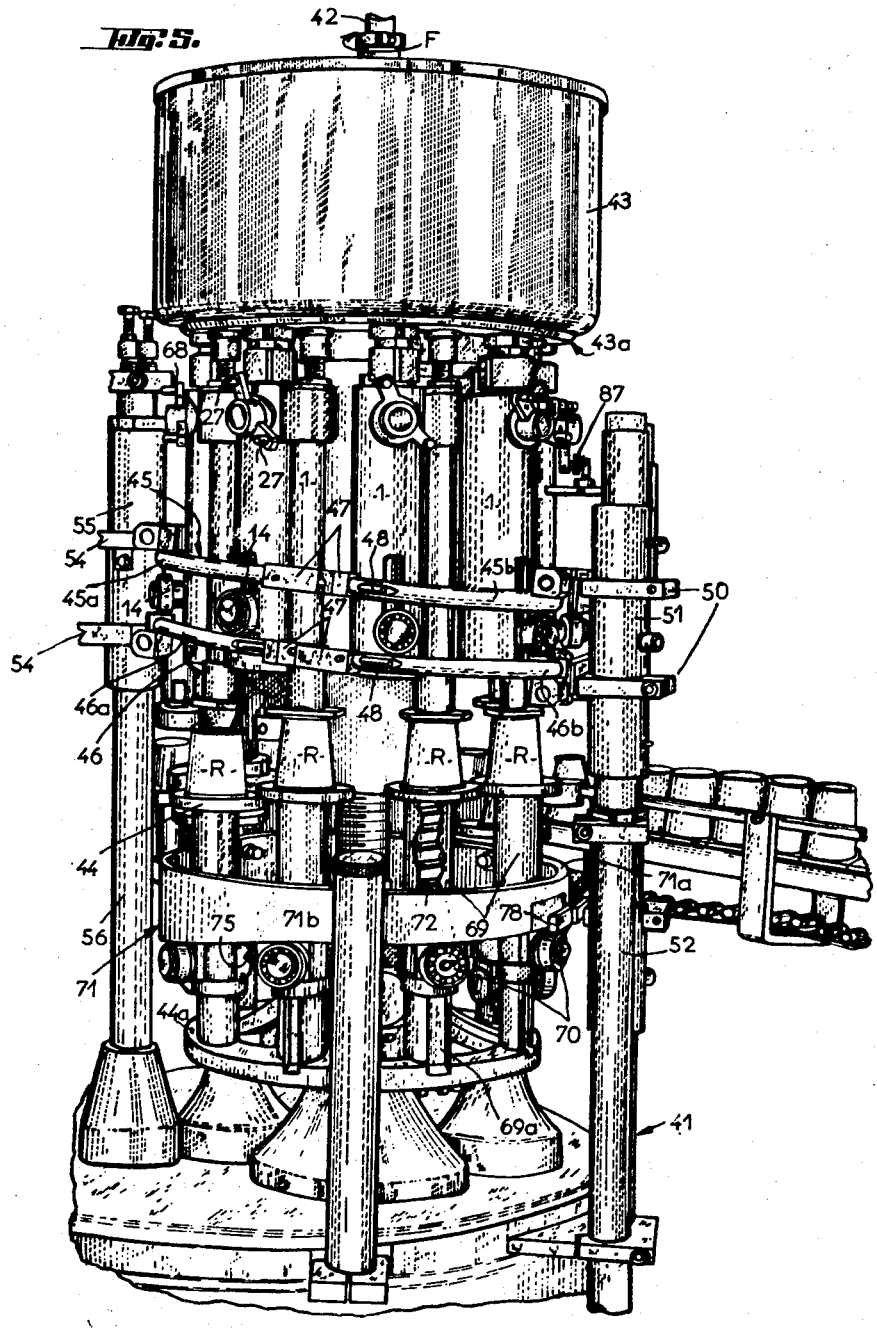

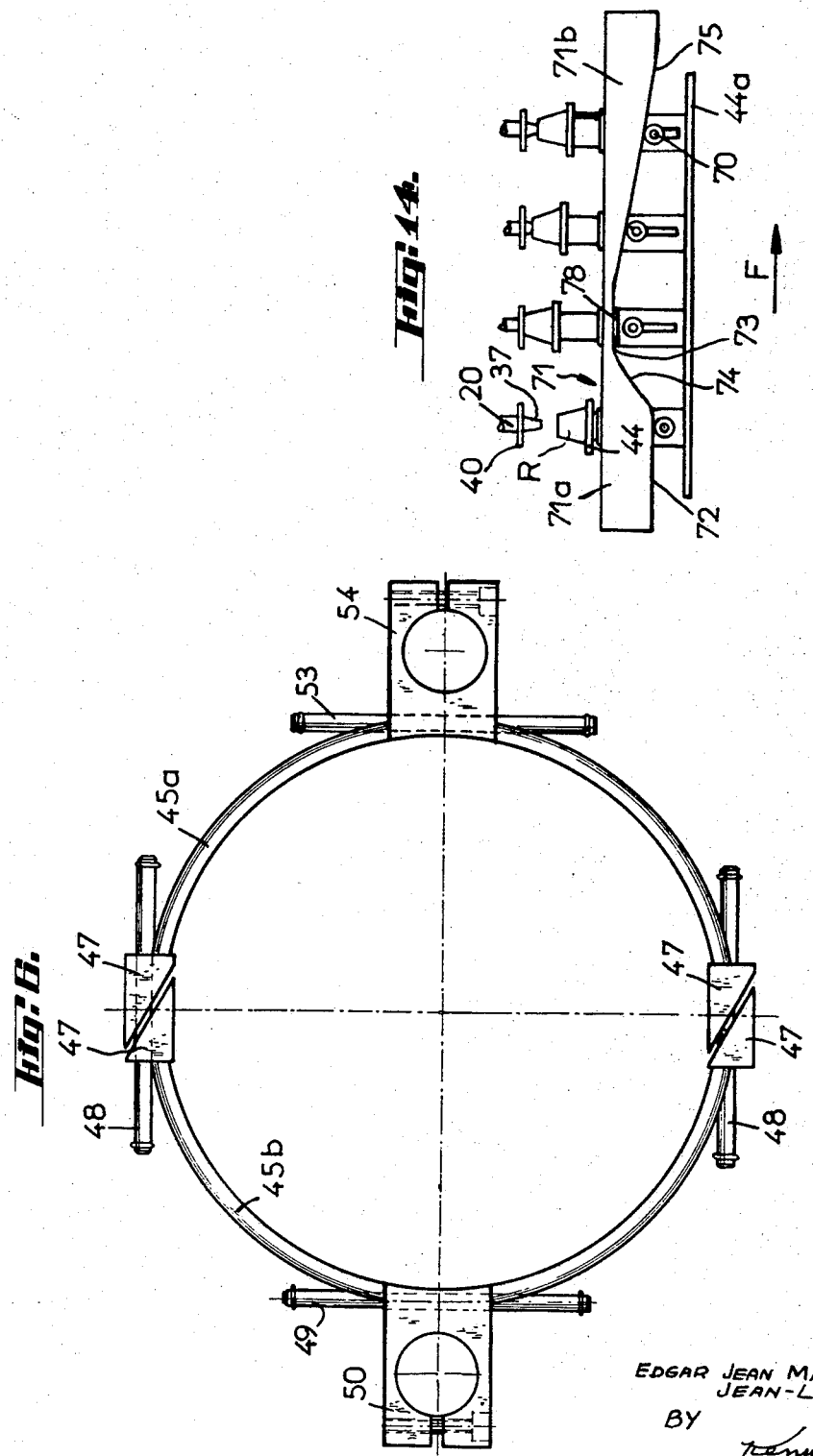

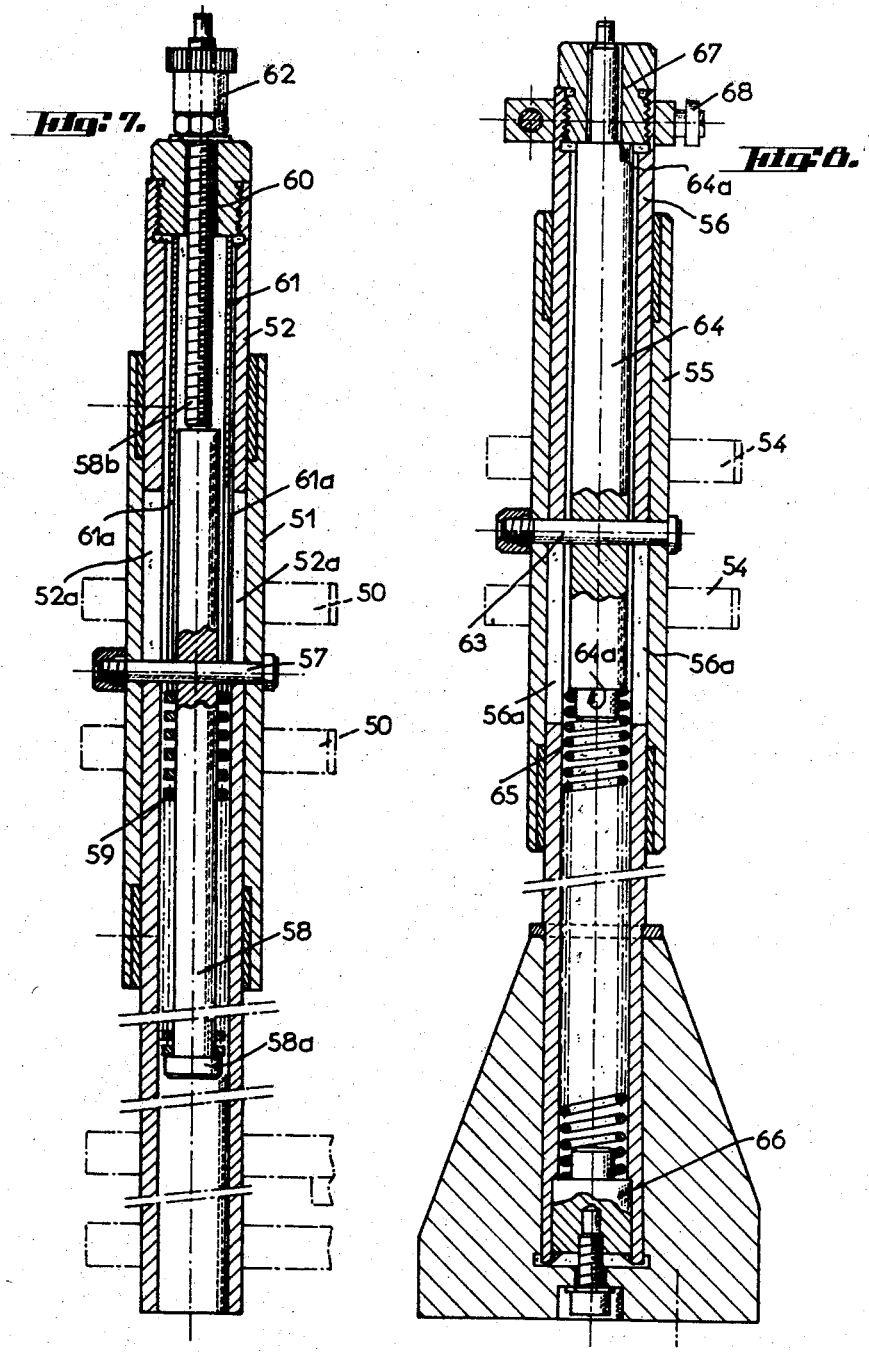

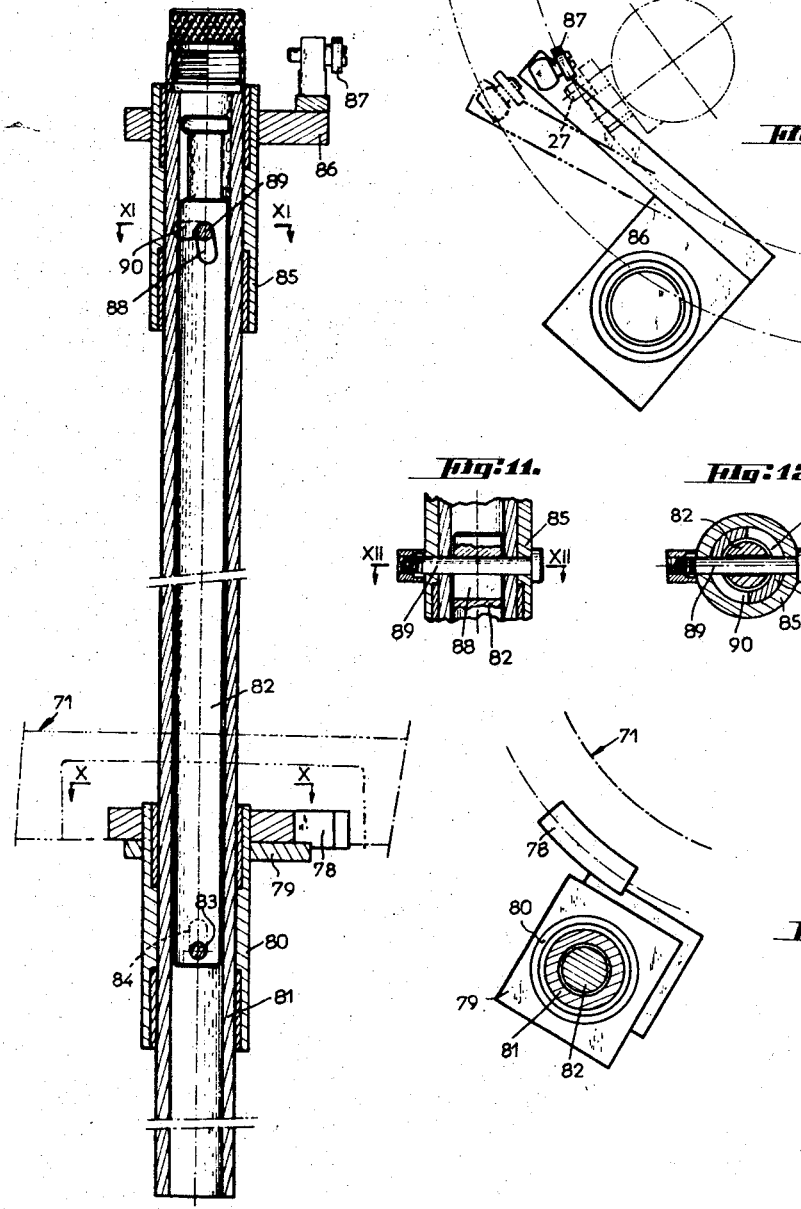

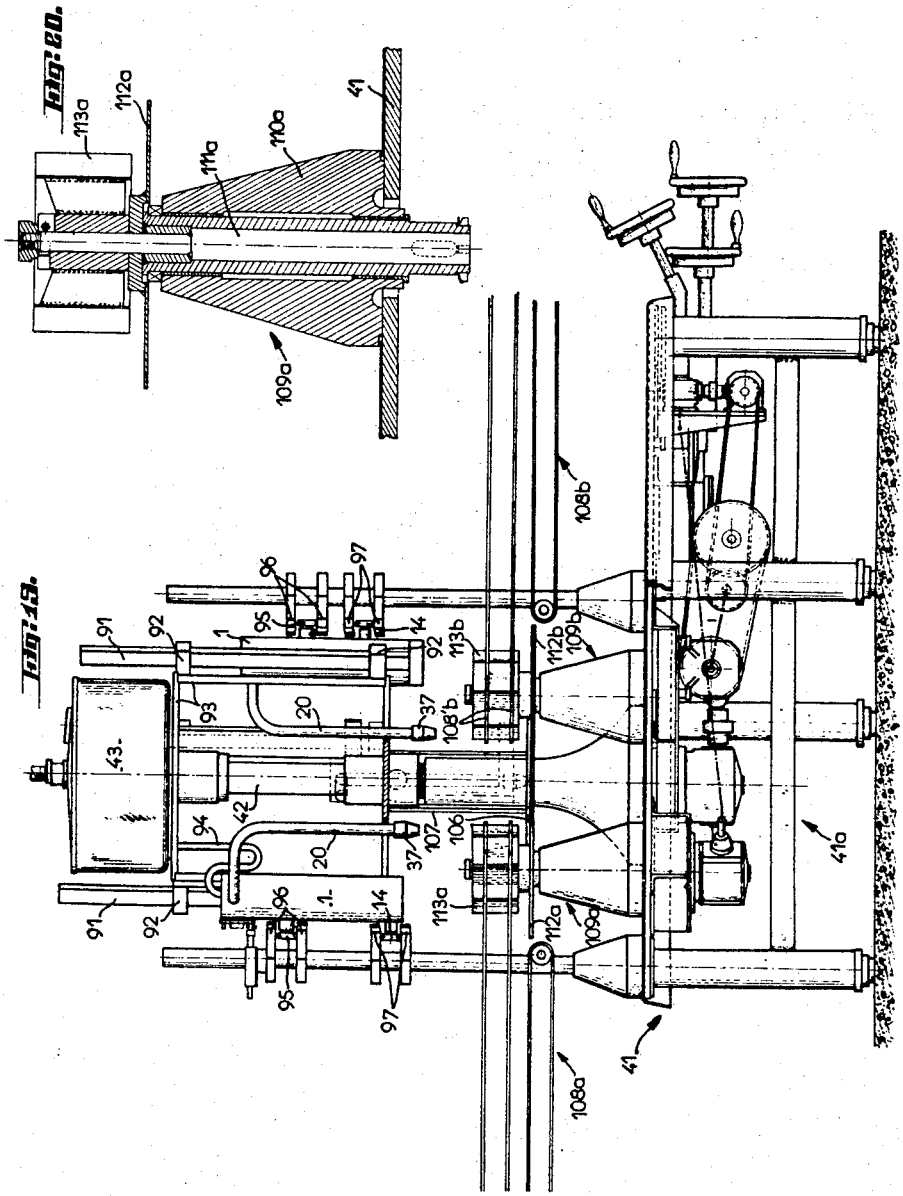

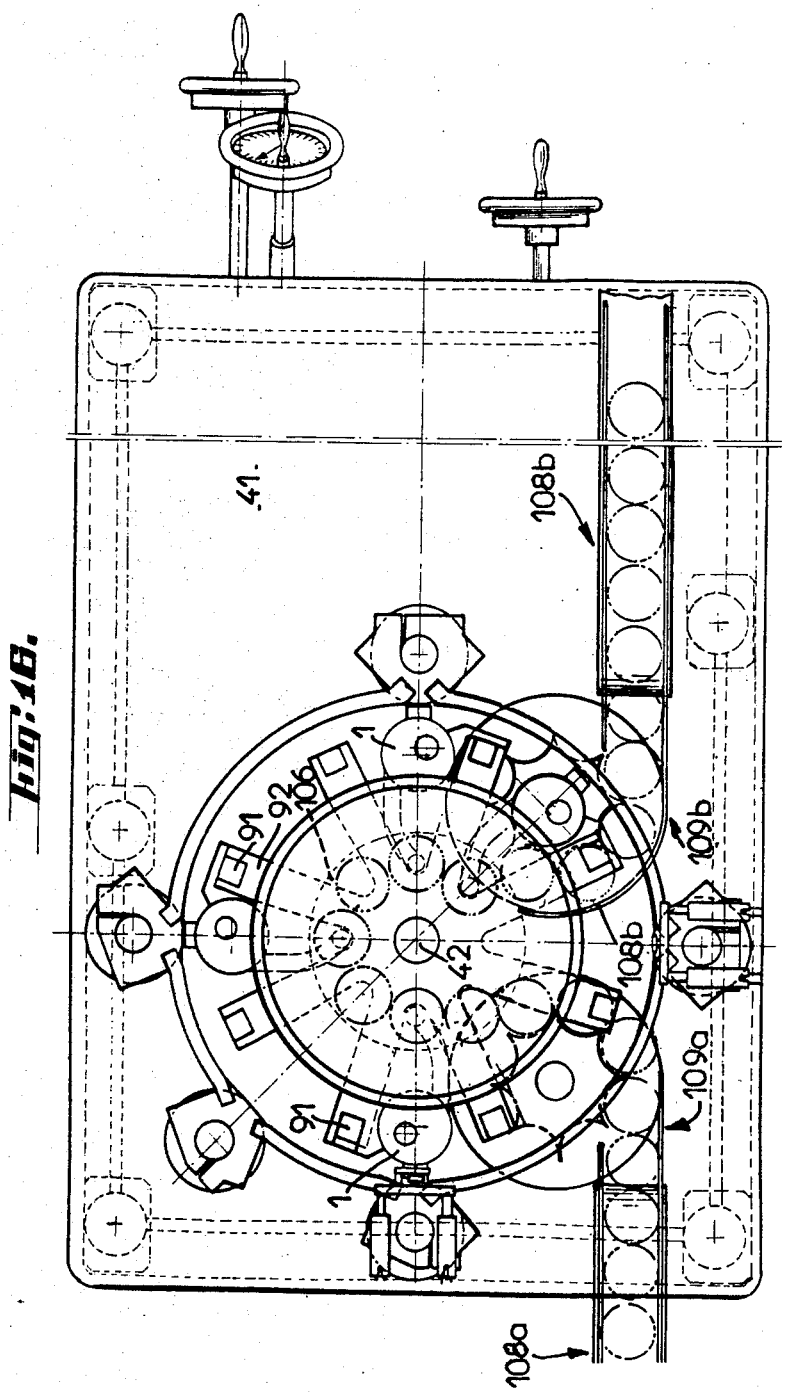

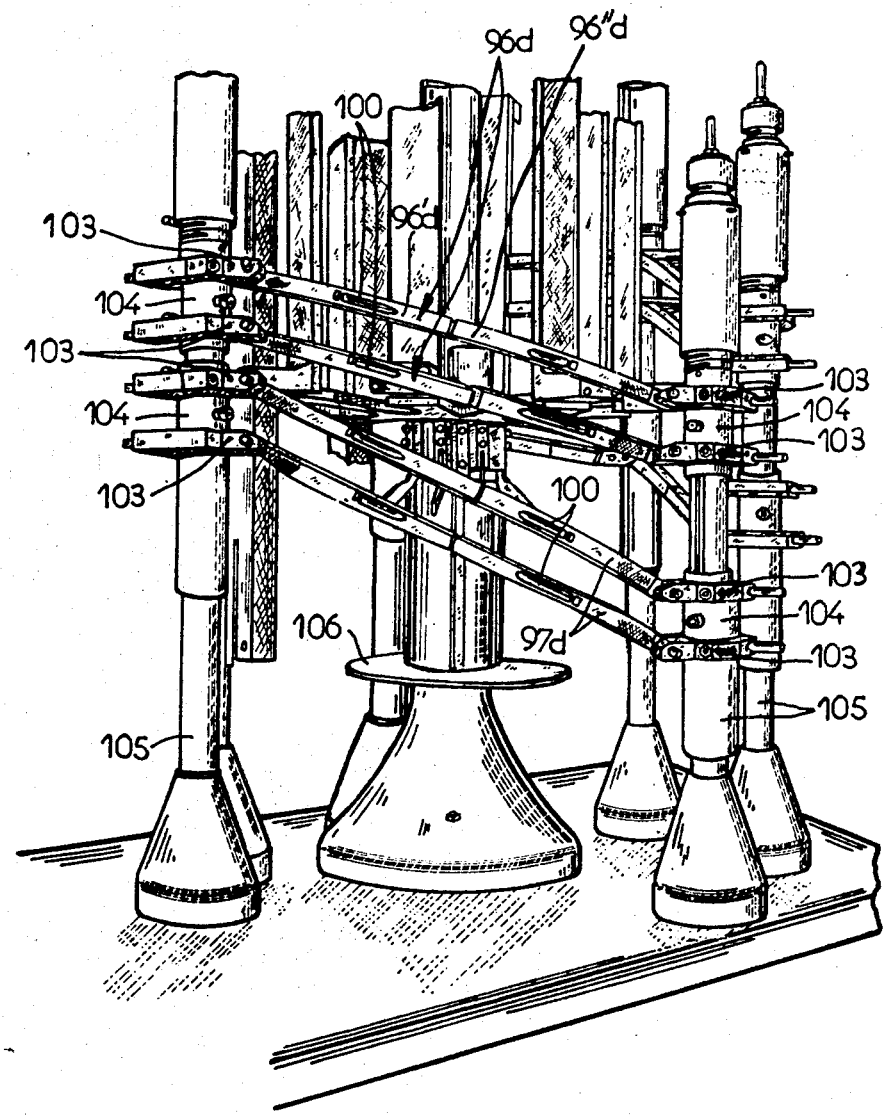

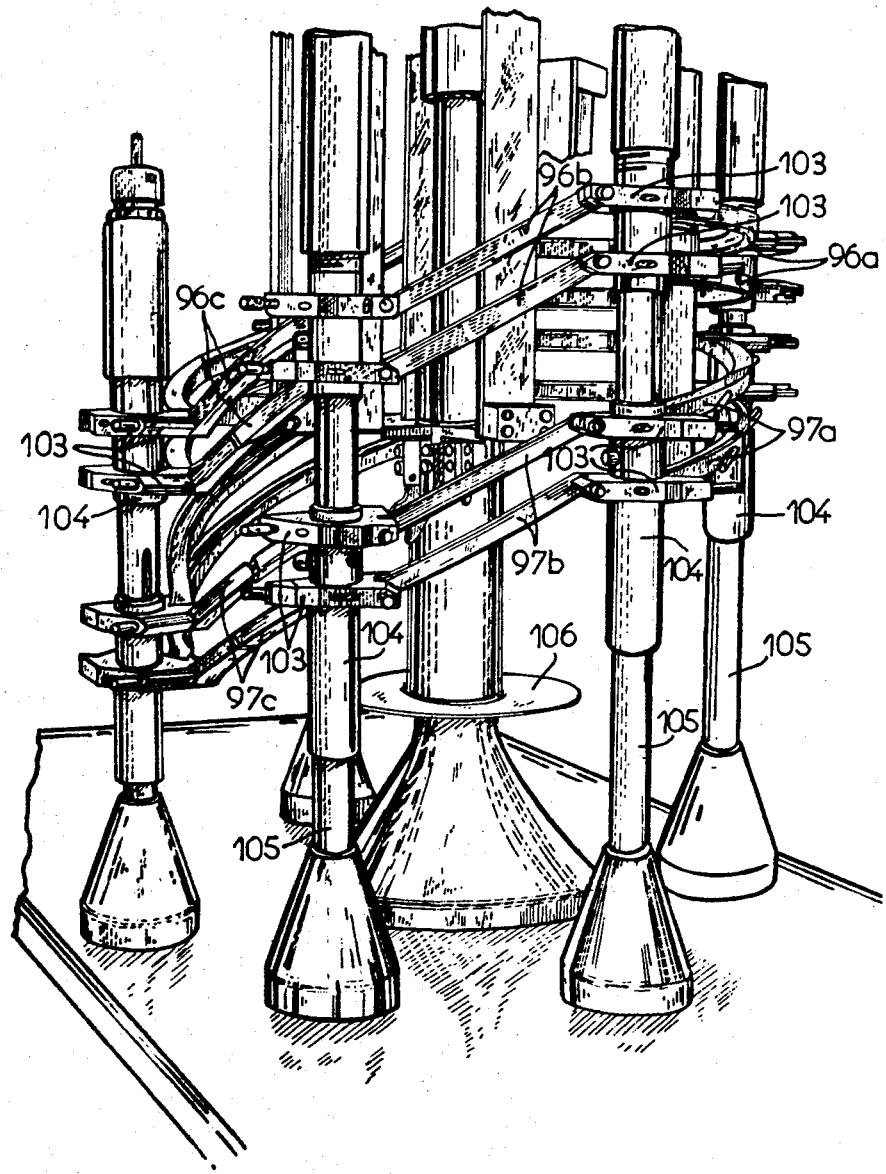

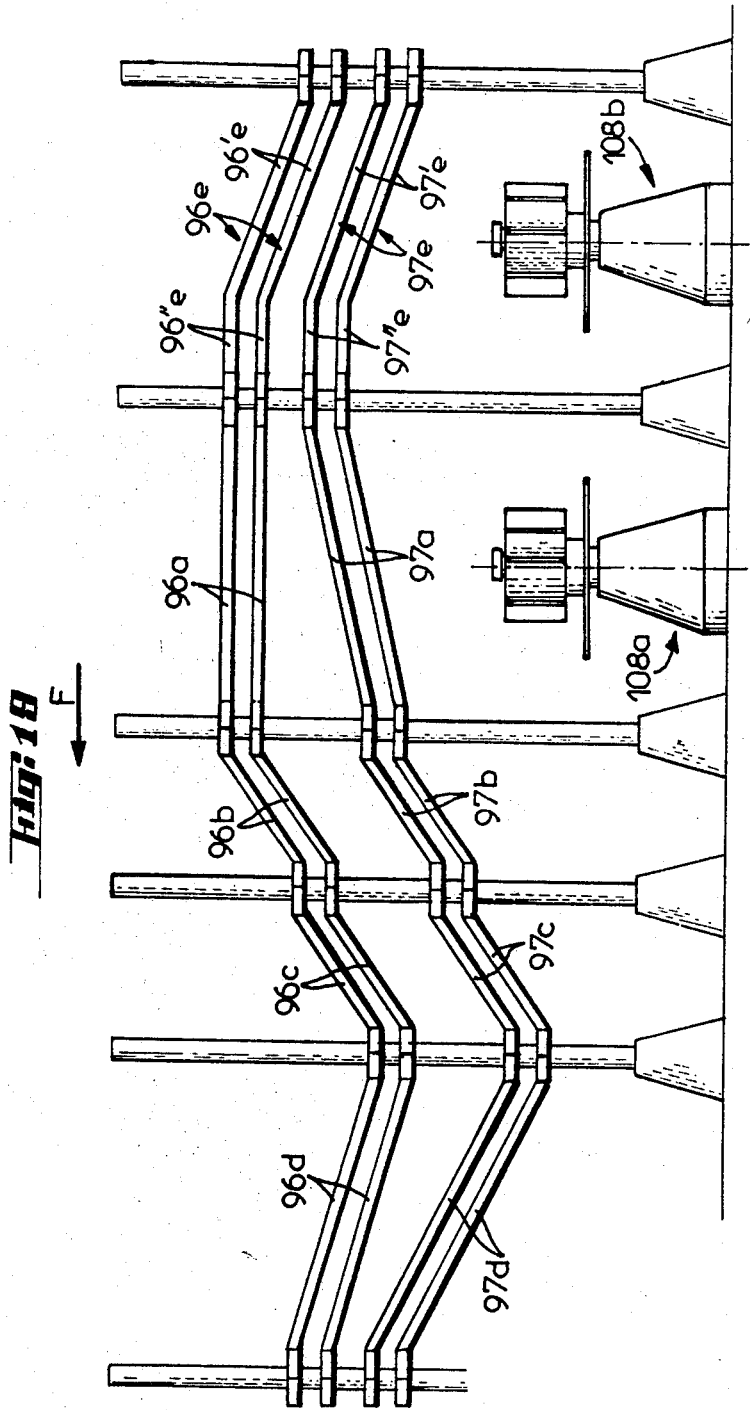

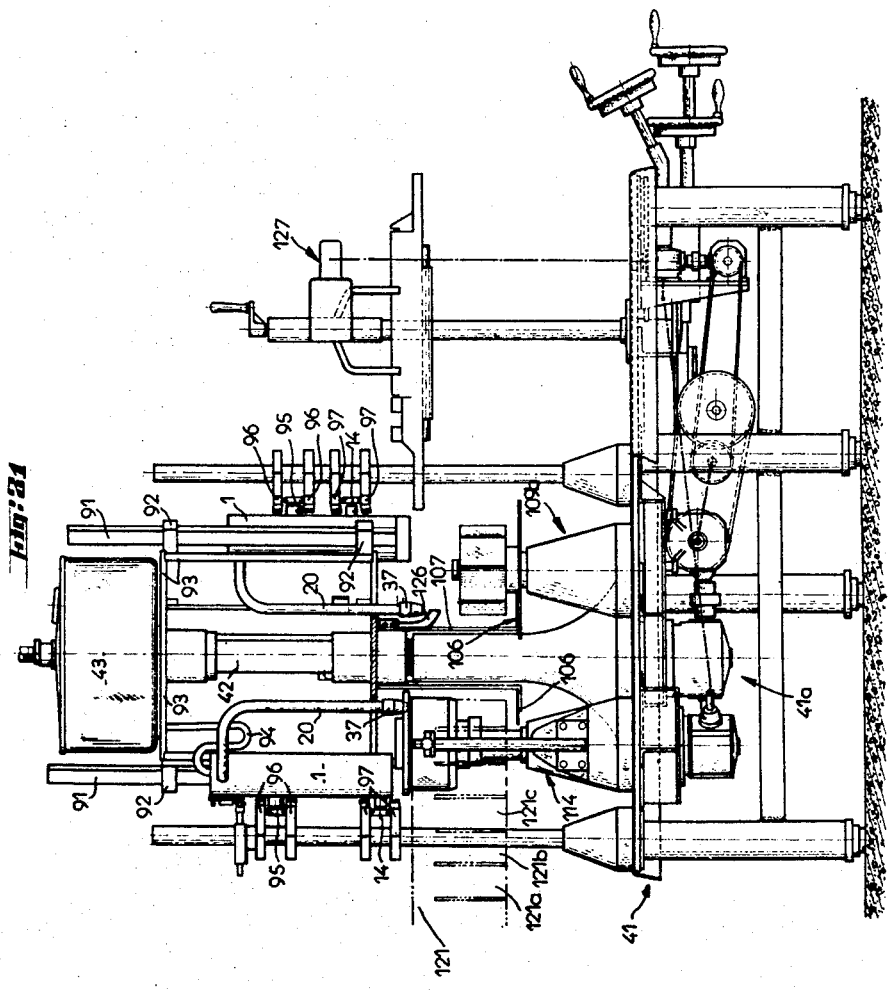

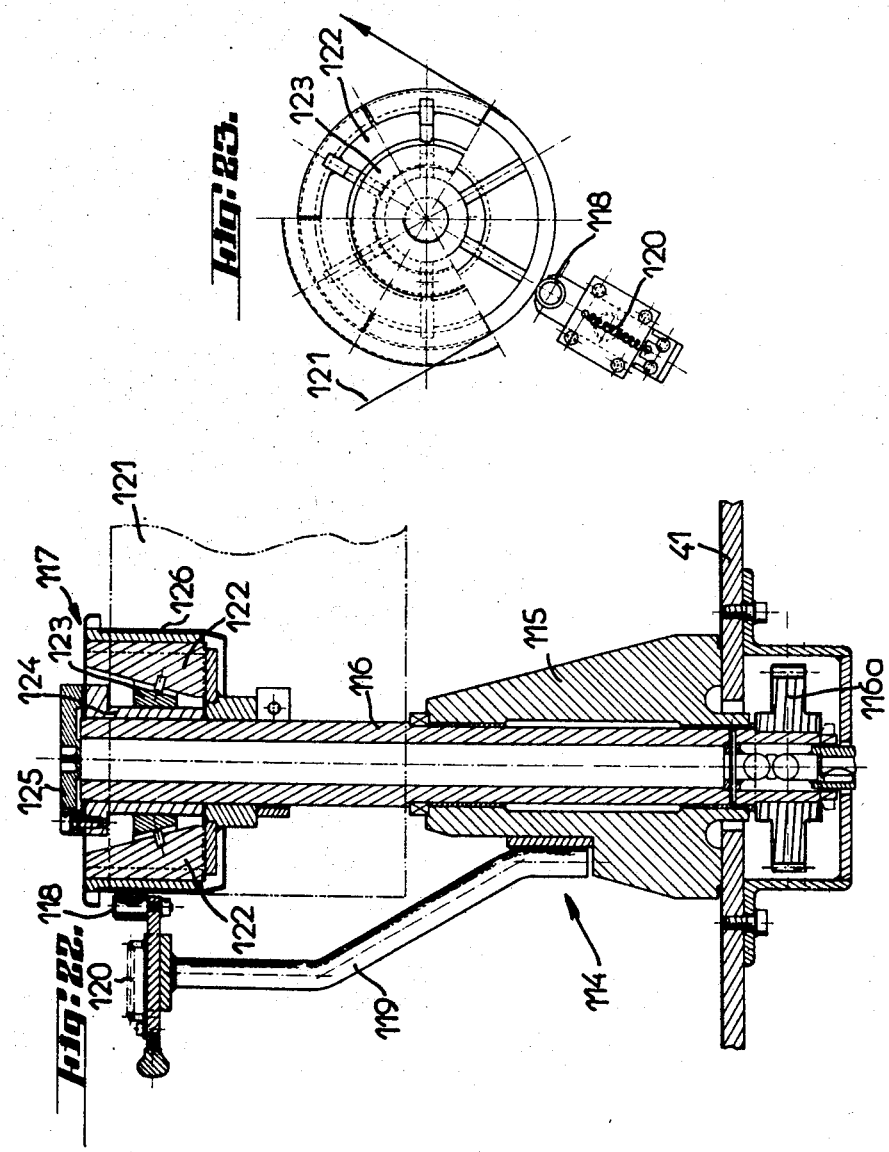

3,400,739
DEVICE FOR METERING LIQUID OR SEMI-FLUID PRODUCTS AND APPARATUS INCORPORATING THE SAME
Edgar Jean Marcel Dardaine and Jean-Luc Berry, Poissy, France, assignors to E. P. Remy & Cie, Poissy, France, a French body corporate
Filed Sept. 21, 1965, Ser. No. 488,876
Claims priority, application France, Mar. 29, 1965, 11,127
29 Claims. (Cl. 141—146)

ABSTRACT OF THE DISCLOSURE

Metering device for dispensing a liquid into containers comprising a vertical piston-pump communicating with a vat and with a dispensing tube by means of a three-way cock, said tube having deformable closing means controlled by the liquid pressure. Means are provided for automatically actuating the pump piston, and the cock, for automatically feeding containers to the metering device and for automatically adjusting the relative position of the dispensing tube and of the container for constant-immersion filling.

---

The present invention is concerned essentially with metering devices for dispensing into containers such as pots, bottles, etc., a constant quantity of a liquid, fluid or semi-fluid product, such as milk, yogurt, jam, etc. contained in a feed vat or the like.

Hitherto known metering devices of this type are characterized by various drawbacks.

With these apparatus the containers are not always filled with a complete uniformity, due notably to the formation of gas bubbles, for example air pockets, mainly in products having been stirred and containing therefore a certain quantity of gas. As a result, the quantity of product actually delivered into each container may vary from one container to another due to variations in the parasitic volume of the gas-filled pockets or bubbles responsive to temperature and pressure conditions.

It is the object of the metering device according to the present invention to avoid these inconveniences and this device is remarkable notably in that it consists of at least one pump comprising in combination a cylindrical vertical body provided with a cylindrical internal chamber closed at its top by a bottom member having slidably fitted therein a piston adapted to draw the product during its upward stroke, a three-way cock communicating on the one hand with said cylindrical chamber through an orifice formed in said bottom member and on the other hand either with a suction port provided at the upper end of said cylindrical body and communicating with said feed vat or the like, or with a delivery port disposed laterally in relation to said cylindrical body and communicating with a dispensing tube delivering the product into said container.

According to another feature characterizing this invention, the aforesaid three-way cock is preferably solid with said cylindrical body and located above said chamber from which it is separated by said bottom member.

According to another feature of this invention, the aforesaid cylindrical body is provided at its upper portion with a hollow tapped connecting member communicating with said suction port, whereby said pump may be secured to a screw-threaded tube communicating with the vat containing the product to be dispensed.

The aforesaid hollow connecting member is secured to said screw-threaded tube by my means of a nut of the opposed threads type to permit the fastening of the pump without having to rotate same about its longitudinal axis.

According to a complementary feature of this invention, said tube extends preferably vertically along the pump body and its upper end communicates with the aforesaid delivery port so as to eliminate any high spot likely to develop air bubbles or pockets.

Still in accordance with the present invention, the aforesaid tube is provided, at its lower end, with a closing diaphragm of resilient material such as rubber or other polymer, which has lips adapted to diverge under the pressure exerted by the product forced by the pump and, in the absence of this pressure, to resume their mutual engagement and thus prevent the flow of product and the ingress of atmospheric air.

The filling of the containers with the product is also a source of considerable difficulties. If the dispensing duct opens in the vicinity of the upper edge of the container, a considerable amount of foam develops, thus making it necessary to either discontinue the filling operation to prevent this foam from overflowing, or effect this operation at a very slow rate.

Various attempts have been made with a view to avoid this drawback, notably by effecting a so-called immersed filling operation consisting in lowering the tube outlet down to the bottom of the container and keeping it thus immersed until the filling operation is completed. This method, while avoiding the formation of foam, makes it impossible to fill the container completely, unless the lower end of the tube is kept moderately immersed in the container, that is, if the tube is released at substantially the rate at which the level of the product varies in the container.

This invention is also concerned with apparatus or installations utilizing pumps of the type broadly set forth hereinabove and notably dispensing apparatus capable of automatically dispensing liquid, fluid or semi-fluid products under conditions whereby the above-listed inconveniences are avoided.

According to an essential feature of this invention, the dispensing apparatus comprises, on a common fixed frame structure, a feed vat containing the product to be dispensed, said vat being rotatably mounted about a vertical axis and comprising dispensing means secured to its lower or bottom wall, these dispensing means constituting a plurality of metering devices of the type broadly set forth hereinabove which are disposed circularly and communicate with the interior of said vat in order to draw the product contained therein, a device for transferring each container to be filled towards one of the tubes of said metering devices, said transfer device being adapted automatically to adjust the position of said container in relation to said dispensing tube as a function of the level attained by the product in the container in order to effect a constant-immersion filling thereof, and mechanical means for synchronously actuating the plug and piston of each metering device, on the one hand, and said container transfer device, on the other hand.

The position of each container in relation to the dispensing tube as a function of the level attained by the product in the container permits of filling same under proper conditions while avoiding the formation of foam.

According to another feature characterizing this invention, each cock plug is provided with externally projecting pins adapted to co-act with at least two stops mounted on the fixed frame structure whereby said plug is rotatably driven each time it engages one of these stops to communicate either the vat to the pump or the pump to the container to be filled.

According to another feature of the present invention, rollers rotatably mounted on members adapted to guide the pump pistons co-act with a fixed cam of substantially cylindrical configuration which surrounds said pump whereby during the rotation of the pump assembly each pump is reciprocated as a function of the angular position of said pump in relation to the frame structure.

Still according to this invention, the device for transferring said containers consists of a set of plates or trays rotatably driven in conjunction with the pump assembly, each plate being also movable vertically, and of a cam member for controlling the vertical displacement of each plate in synchronism with the rotation of the plate assembly.

According to another form of embodiment of the dispensing apparatus of this invention, the metering devices are movable in translation in relation to the containers, said metering devices being rotatably driven from the transfer device while being kept at a constant level, the displacement of each metering device in relation to the container associated therewith being subordinate to the level attained by the product in the container so as to perform a constant-immersion filling operation.

It will be seen that in the case of the apparatus of this alternate form of embodiment of the present invention, it is not the container that has its own motion in relation to the pump body, but on the contrary the pump body proper that effects a movement of translation in relation to the container.

According to another feature of this invention, the aforesaid device for transferring the containers consists of an annular platform rotatably driven in conjunction with the metering devices, the empty containers being fed in succession on said platform by an input member operating in synchronism with the installation, whereby a container is associated with each metering device, the filled containers being discharged from said platform by an output member operating likewise in synchronism with the installation.

In the case of containers separate from one another such as pots, jars or the like, the aforesaid input and output members consist preferably of spiders or like members rotatably driven in opposite directions.

In the case of containers constituting together a string, chain or like assembly of containers made from flexible material and interconnected by a continuous strip of the same material, the aforesaid support comprises, in addition to the aforesaid annular platform, a set of hooks or like members rigid with said platform and engageable by the containers, the aforesaid input member consisting of a rotary device driving said continuous strip and the empty containers attached thereto, the aforesaid output member consisting of an output spider revolving in the opposite direction in relation to said driving member.

From the foregoing it is clear that the present invention permits of filling both rigid containers and flexible containers.

Other features and advantages of this invention will appear as the following description proceeds with reference to the accompanying drawings given by way of example and illustrating diagrammatically various forms of embodiment of the invention. In the drawings:

FIGURE 1 is an axial section with parts broken away, showing the metering device according to this invention;

FIGURE 2 is an axial section showing the same device, the section being taken upon the axis of the dispensing tube;

FIGURE 3 is a section taken upon the line III—III of FIGURE 1;

FIGURE 4 is a plan view from beneath showing on a larger scale the aforesaid dispensing tube;

FIGURE 5 is a comprehensive view of a dispensing or tapping apparatus equipped with the metering devices of this invention and driven from mechanical means;

FIGURE 6 is a fragmentary view showing one of the two ramps or cam faces constituting the cam means for controlling the pistons of the metering devices in the apparatus of FIGURE 5;

FIGURE 7 is a sectional view showing the device for supporting the lower component elements of said cam means;

FIGURE 8 is a sectional view showing the device for supporting the upper component elements of said cam means;

FIGURE 9 is a sectional view showing the device for retracting the stops controlling the cock plugs;

FIGURE 10 is a section taken upon the line X—X of FIGURE 9, showing the pedal for controlling the rotation of said device;

FIGURE 11 is a fragmentary section showing the stop retracting device, the section being taken in a plane normal to the plane of the section of FIGURE 9;

FIGURE 12 is a section taken upon the line XII—XII of FIGURE 11;

FIGURE 13 shows said stops and the rotary plate on which they are mounted;

FIGURE 14 shows diagrammatically and in developed view the device for transferring the containers in the apparatus illustrated in FIGURE 5;

FIGURE 15 is an elevational part-sectional view showing a dispensing apparatus according to a modified form of embodiment, wherein only two pumps are shown in order to simplify the illustration;

FIGURE 16 is a plan view from above of the apparatus of FIGURE 15;

FIGURE 17 is a comprehensive perspective view of the apparatus shown in FIGURES 15 and 16, but with the pumps as well as the container transfer means removed therefrom in order to simplify the illustration;

FIGURE 18 is a general view of the device of FIGURE 17 but as seen from the opposite side;

FIGURE 19 illustrates diagrammatically in developed view the cam means controlling the pistons and pump supports;

FIGURE 20 is an axial section showing a spider of the container transfer device;

FIGURE 21 is an elevational and part-sectional view showing a modified form of embodiment of the means for filling containers occurring in the form of a string or chain of containers;

FIGURE 22 is a section showing the driving member incorporated in the container transfer device illustrated in FIGURE 21, and FIGURE 23 is a plan view from above of the same driving member.

Referring first to FIGURES 1 to 4 inclusive, it will be seen that each metering device designated generally by the reference numeral 1 comprises a body 2 of elongated cylindrical configuration in which a chamber 3 is formed; this chamber 3 is closed at its top by a partition or bottom wall 4 and has slidably mounted therein a piston 5 provided with an integral rod 6. This rod 6 carries at its lower end a cylindrical guide member 7 sliding in turn in another chamber 8 constituting the lower extension of chamber 3 and communicating with the outside at its lower open end 9. The inner diameter of this other chamber 8 is slightly greater than that of chamber 3 and the two chambers are interconnected by a annular groove 10 to prevent the impurities or dirt possibly carried along by the guide member 7 from penetrating into the upper chamber 3. The cylindrical body 2 has two slots 11, 12 formed in its lower portion to permit the insertion of a cross pin 13 secured in the guide member 7 and having a roller 14 mounted on its projecting end. This pin 13 secured to said guide member 7 by means of a screw is provided with guide blocks 15, 16 preferably of plastic or like material which engage the edges of said slots 11 and 12.

The upper portion of the pump body 2 constitutes a three-way cock or valve and comprises a lower orifice 17 communicating with chamber 3, an upper suction orifice 18 coaxial to said orifice 17 and opening into the upper end of the cylindrical body 2, and a lateral delivery orifice 19 disposed at right angles to said orifices 17 and 18 and adapted to communicate with a dispensing tube 20 disposed laterally and parallel to the pump body to which it is rigidly secured. The orifices or ports 17, 18 and 19 open on the other hand into a common bore 21 in which a cock plug 22 is rotatably mounted; according to the position in which this plug 22 is set, the chamber 3 communicates either with the suction orifice 18 (as shown in FIGURE 2) or with the dispensing tube 20.

The plug 22 is retained in the bore 21 by means of a lock pin 23 engaging a circular groove 24 formed in the outer periphery of the plug. Thus, removing the plug and cleaning the intake member are very simple operations since it is only sufficient to remove the lock pin 23 for releasing the plug 22.

The plug 22 carries a stud or like hub 25 projecting from the pump body (see FIGURE 3) and has secured thereon a socket or like member 26 (see FIGURE 1) carrying a pair of pins 27 adapted to engage stop members (as will be explained presently) for rotating the plug.

The upper portion of the pump body has an extension in the form of a screw-threaded tip 28 whereby the pump may be secured to a similarly screw-threaded tube neck or like member 29 communicating with the vat, reservoir or tank containing the product to be dispensed. This tube 29 may be secured on any suitable support 30 consisting for example of the botom wall of said vat.

The mounting is effected by means of a nut 31 having opposed threads so that it can be screwed simultaneously on the tip 28 and tube 29. With this nut, the pump can be mounted on the tube 29 without having to rotate the pump about its longitudinal axis, whereby it can be set in the proper angular position. A gasket 32 seals the joint between the tip 28 and the tube 29.

The dispensing tube 20 is fitted in a fastening member 33 detachably mounted on the upper portion of the pump body 2 by means of a dovetail joint 34. The fastening member 33 bears against a shoulder 35 of the pump body and is held in position by screw-and-nut means 36 engaging on the one hand the top face of member 33 and on the other hand on the support 30. This screw-and-nut means 36 constitutes a variable-length abutment and also a bearing for absorbing flexion stress generated by the torques acting upon the pump.

At its lower end the tube 20 is provided with a closing diaphragm 37 of resilient material such as rubber in which three lips 37a, 37b and 37c, each comprising an intermediate slit 38a, 38b and 38c, are formed, these lips being adapted to be pushed aside under the pressure of the product forced by the pump into the tube 20 and, in the absence of this pressure, to resume their mutual engagement and thus prevent the egress of product and the ingress of atmospheric air.

The annular gaskets 39a, 39b and 39c provide the necessary fluid tightness between the dispensing tube 20 and the member 33, on the one hand, and between this member 33 and the pump body on the other hand.

The tube 20 comprises, in addition, at its lower end, above the diaphragm 37, a flange or plate 40 constituting an abutment for a container (not shown). This flange may have for example the shape of a portion of a circle or annulus to provide a convenient bearing surface for the upper edge of the neck of a pot or other container, for example, while permitting the escape of air therethrough during the container filling operation.

This invention is also concerned with automatic dispensing installations or apparatus for filling containers under conditions adapted to prevent the formation of air bubbles, pockets or like inclusions, and also the foaming of the product.

FIGURES 5 to 14 inclusive illustrate a dispensing apparatus according to this invention which is provided with metering devices of the type described hereinabove.

This dispensing apparatus (see FIGURE 5) comprises essentially a fixed frame structure 41 in which a vertical main shaft 42 is journaled for rotation and adapted to be rotatably driven by a suitable power unit, for example an electromotor (not shown). This shaft 42 carries at its upper end a vat 43 of substantially cylindrical configuration which is thus rotatably driven therewith and contains the product to be dispensed, for example yogurt. Mounted on the bottom wall 43a of vat 43 are a series of metering devices 1, all of same type, which draw the product stored in the vat and deliver same into the containers.

Each roller 14 of a pump co-acts with a cam system consisting of a pair of superposed parallel cam members 45, 46 (FIGURE 5) of substantially circular configuration, rigid with said frame structure and surrounding the pump assembly. These cam members 45, 46 are inclined to the horizontal so that each piston is reciprocated by turns as a function of the angular position of the pump with which it is associated in relation to the frame structure. Each roller 14 co-acts during one half-revolution with the upper cam member 45 and during the next half-revolution with the lower cam member 46. Each cam member 45 and 46 consists on the other hand of a pair of identical semi-circular elements or sections 45a, 45b and 46a, 46b of which the two registering ends are provided with complementary connecting members 47 slidably fitted on rods 48 to permit the movements of said elements towards and away from each other as a function of the inclination given to said cam members. The junction members 47 are bevelled in order to ensure a continuous guiding of the rollers.

The two semi-circular elements 45b and 46b constituting the lower elements of said inclined cam members 45 and 46 respectively are hingedly mounted by means of pins 49 on clamps 50 rigid with a common sleeve 51 slidably mounted on a fixed column 52 (see notably FIGURES 6 and 7). Similarly, the upper elements 45a and 46a are hingedly mounted by means of pins 53 on clamps 54 rigid with a common sleeve 55 slidably mounted on another fixed column 56 (see FIGURES 5 and 8).

Referring now to FIGURE 7, it will be seen that the sleeve 51 on which the clamps 50 of the lower elements 45b and 46b are mounted is rigidly assembled, by means of a cross bolt or like pin 57, with an axial rod 58 responsive to a coil compression spring 59 bearing with one end against the head 58a of said rod 58 and with the other end through the medium of a tubular member 61 against a screw plug 60 engaging the top of column 52. The rod 58 has a screw-threaded upper extension 58b of smaller diameter screwed in said plug 60 and adapted to be rotated from the outside by means of a knurled knob 62. With this specific mounting the sleeve 51, for example in case of jamming of one pump, can slide upwards against the elastic resistance of spring 59. Of course, the column 52 as well as the tubular member 61 are provided with slots 52a and 61a permitting the passage of the cross bolt 57. The position of rod 58 and therefore of sleeve 51 may be adjusted from the outside by reason of the provision of the aforesaid nut 62, whereby the inclination of cam members 45 and 46 may be adjusted at will.

Referring now to FIGURE 8, it will be seen that the sleeve 55 on which the clamps 54 of the upper elements 45a and 46a are mounted is rigidly assembled by means of a cross-bolt or pin 63 with a rod 64 mounted in the column 56 and responsive to a coil compression spring 65 bearing with one end against a shoulder 64a of said rod and on the other hand against a lower stop 66 secured to the lower portion of column 56. The rod 64 bears with its upper shoulder 64b against a screw plug 67 engaging the upper end of column 56. It will be seen that with this assembly the semi-circular cam elements 45a and 46a are capable, in case of pump jamming, of pushing the sleeve 55 and therefore the rod 64 downwards against the resistance of spring 65. Of course, slots 56a are formed in column 56 to permit the passage of the cross-bolt or pin 63. The column 56 carries at its upper end a fixed stop 68 co-acting with the pins 27 of the pump plugs.

The device for feeding the containers R consists of a set of plates or trays 44 equal in number and parallel to said pumps, these plates being mounted on a common angular member 44a revolving bodily with the main shaft 42. Each plate 44 is carried by a tubular body 69 slidably mounted on a vertical upright 69a and provided with a roller 70 co-acting with a guide cam member 71. A spring or like means 72 urges the plates upwards and therefore to a position of engagement of the roller 70 with the cam member 71.

The cam member 71 comprises a first fixed element 71a of which the lower edge has a first section 72 of substantially rectilinear contour which corresponds to the lower position of the plates in which they receive the empty containers fed by the conveyor belt 8, and a second section 73 also of substantially rectilinear contour which corresponds to the upper position of the plates, that is, the position in which the containers are lifted towards the dispensing tubes 20. These two rectilinear sections 72 and 73 are interconnected by a transition zone 74. The cam member 71 comprises another detachable element 71b of which the lower edge 75 has a contour designed with a view to control the gradual downward movement of the plates which corresponds to the gradual rise of the level attained by the product in the container. Of course, this contour is consistent with the shape of the container. A set of interchangeable elements such as 71b may be provided, each element corresponding to a predetermined type of container.

In order to prevent the product from being delivered by the pump in case of unforeseen absence of a container on a plate or tray 44, a safety device is provided whereby the stop controlling the rotation of the pump plug is retracted in due time.

This safety device illustrated in FIGURES 9 to 13 comprises esentially a pedal or like actuator 78 disposed in close vicinity of the section 73 of cam member 71 so as to project slightly above said section. This pedal 78 is mounted on a support 79 rigid with a sleeve 80 slidably mounted in turn on a hollow column 81. Mounted in this column 81 is a rod 82 rigidly assembly by means of a pin 83 with the aforesaid sleeve 80. A slot 84 formed in the hollow column 81 permits the passage of said pin 83. At the upper portion of this hollow column 81 a sleeve 85 is rotatably mounted and has secured thereto a plate 86 carrying a stop member 87 adapted to co-act with the pins 27 of the cock plugs. The rod 82 has a slot 88 preferably of helical configuration formed therein, this slot being engaged by a pin 89 secured to the sleeve 85. When the rod 82 moves vertically upwards or downwards it causes the sleeve 85 and therefore the stop member 87 to revolve to an extent sufficient to position same in or out of the path of the pins 27 of the cock plugs. Of course, horizontal slots 90 are provided in the column 81 to permit the rotation of pin 89.

The dispensing and filling apparatus operates as follows: When the vertical shaft 42 revolves, it rotatably drives the vat 43 as well as the metering devices 1 rigid therewith and the set of plates or trays 44. The rollers 14 controlling the movement of translation of the pistons, which are disposed between the two inclined cam members 45 and 46, are thus caused to effect a vertical upward stroke in relation to the pump body with which they are associated, during a 180-degree rotation, and a vertical downward stroke during the next 180-degree rotation.

Assuming that the rotation takes place in the direction of the arrow F of FIGURE 5, the roller 14 of the first pump on the left-hand side of FIGURE 5, which is in its uppermost position, engages the concealed portion of the upper cam member 45 and is caused by this member to slide downwards and therefore to move the piston associated therewith in the same direction. At this time, the position of the corresponding three-way cock plug is such that it interconnects the orifices 17 and 18, whereby the pump will draw the product contained in the vat 43. Of course, in the same position the plug closes the orifice 19 communicating with the dispensing tube 20, so that this phase of the cycle of operation is utilized for feeding empty containers to the plates or trays and remove the filled containers therefrom.

When a pump begins to draw the product, that is, when it is in its remotest position to the left in FIGURE 5, the plate 44 corresponding thereto is at the same time in its lowermost position since its roller 70 engages the substantially rectilinear section 72 of element 71a of cam member 71. It is in this lowermost position of the plate that the exchange of containers is accomplished. When the roller 70 engages the transition section 74 the plate 44 is moved upwards by the spring 72 until the empty container carried by this plate engages the flange 40 carried by the lower portion of the dispensing tube 20. The cam member 71 is so adjusted that at this time the roller 70 lies substantially beneath the rectilinear section 73 and even beneath the pedal 78 of the retracting device, so that it does not engage this pedal. After a 180-degree rotation, the roller 14 of the pump considered herein engages the lowermost section of the upper cam member 45, and at this time the suction phase is completed. Then, roller 14 engages the lower cam member 46 and is thereby moved upward to begin the delivery phase of the cycle.

In case, as assumed herein, the container R has stopped the upward stroke of plate 44 so that the roller 70 is clear of pedal 78, the retracting device does not operate and the retractable stop 87 remains in the path of pins 27 of the cock plug, thus causing the latter to rotate through a certain angle and interconnect the orifices 17 and 19 of the three-way cock.

When the roller associated with the pump considered herein engages the portion of cam member 46 which is visible in FIGURE 5, that is, the ascending section of this cam member, it moves the piston upwards so that the relevant pump will force the product into the container R. At the same time, the roller 70 controlling the movement of the plate 44 associated with this pump rolls along the lower edge of the element 71b of cam member 71. This element has a descending section following the roller so that the plate and therefore the container are gradually lowered until they engage the rectilinear section 72 of element 71a. At this time, the piston has completed its upward stroke, having thus forced the whole of the product contained in the pump into the container. The pins 27 then engage the fixed stop 68 and the orifices 17 and 18 are again interconnected, the cycle of operation being thus resumed.

It will be seen that if no container is carried by the plate 44 its upward movement is stopped only by the roller 70 engaging the edge 73 of element 71a of cam member 71. This roller will then lift the pedal 78 and cause the latter to move axially along the column 82 and thus rotate the sleeve 85 and therefore retract the stop 87 from the path of the plug control pins 27. In this case, the communication is not established between the orifices 17 and 19, and during the next half-cycle the product is simply forced back into the vat.

It may be noted that unless it is forced by the pump, the product remains in the tube 20 without flowing out. In fact, the product is retained therein on the one hand by the lips of the diaphragm 37 which engage one another and thus prevent the product from flowing therethrough and the air from penetrating into the tube, and on the other hand by capillarity. As a result, no air pocket or air lock can develop in the pumping circuit, provided of course that a sufficient quantity of product is kept in the vat.

Referring now more particularly to FIGURES 15 and 16, it will be seen that the apparatus according to the modified form of embodiment of the invention which is shown therein comprises like the apparatus illustrated in FIGURES 5 to 14, a fixed frame structure 41 on which the motor, reduction gears, bevel gears, etc. are mounted, these elements constituting the mechanism for driving the apparatus designated generally by the reference symbol 41a, and a vertical shaft 42 rotatably driven from said mechanism, this shaft carrying at its upper end a vat 43 containing the product to be dispensed.

As contrasted with the apparatus shown in FIGURES 5 to 14, the metering or pump devices 1 are not mounted on the lower or bottom wall of the vat or reservoir 43, but each of them is secured to an upright 91 slidably mounted in turn on clamps 92 carried by a frame or like member 93 rigid with the main shaft 42. Each metering device or pump 1 is connected to the vat 43 through a flexible hose 94. Each pump body comprises a control roller 95 engaging a cam member rigid with the frame structure and consisting of two superposed parallel cam elements designated generally by the reference numeral 96 (see FIGURE 15). This cam member of substantially circular configuration surrounds the set of pumps as in the case of the cam means controlling the rollers 14 rigid with the pump pistons, this last-mentioned cam means consisting of cam members 97.

The cam members 96 and 97 consist of a series of juxtaposed elements or sections having different inclinations to the horizontal. Thus, cam member 96 consists of elements 96a, 96b, 96c, 96d and 96e, and cam member 97 consists similarly of elements 97a, 97b, 97c, 97d and 97e (see FIGURES 17 to 19). The inclined cam elements such as 96d (see FIGURE 17) consists of two juxtaposed sections 96′d, 96″d bevelled at their abutting ends in order to ensure a continuous guiding of the rollers. These two cam sections 96′d and 96″d are slidably engaged on rods 100 so that they can be moved towards and away from each other as a function of the inclination given to these cam elements. These rods correspond to the rods 48 of the apparatus illustrated in FIGURES 5 to 14.

The various cam elements are pivoted at their ends on brackets 103 rigid with sleeves 104 slidably mounted on fixed columns such as 105. The sleeves 104 are mounted on their relevant columns in the same manner as sleeves 51 on columns 52 and sleeves 55 on columns 56 of the preceding form of embodiment.

Referring now to the diagram of FIGURE 19 showing the relative inclination of the cam members 96 and 97, it will be seen that the two cam elements 96a on the one hand and 97a on the other hand deverge from each other, element 97a having a descending slope and element 96a being horizontal. Then, both elements 96b and 97b have the same descending slope. Similarly, the elements 96c and 97c have the same ascending slope, with the same inclination as the preceding elements. Then the two cam elements tend to converge toward each other; as a matter of fact, elements 96d have a moderate ascending slope and elements 97d have a steeper ascending slope, the difference between these two slopes being subordinate to the rise in level of the product in the containers or, in other words, for a given pump output, to the shape of these containers. Finally, the cam elements 96e and 97e are parallel to each other, with firstly ascending sections 96′e and 97′e, and then rectilinear sections 96″e and 97″e merging respectively into cam elements 96a and 97a.

Assuming that the rotation takes place in the direction of the arrow F of FIGURE 19, when the roller 95 of a pump rolls along the cam element 96a the roller 14 engages the cam element 97a, and the pump body remains in its constant-level condition while the piston moves downwards in the pump body, thus drawing the product contained in the vat 43. The rollers 95 and 14 subsequently engage the elements 96b, 96c and 97b, 97c, respectively, and since these elements are parallel no movement of the piston in relation to the pump body takes place and the pump filled with the product slides downwards, the lower end of the dispensing tube 20 which carries the closing diaphragm 37 penetrating into the underlying container. The rollers 95 and 14 then roll along cam elements 96d and 97d. The piston forces the product into the container while the pump body and therefore the dispensing tube 20 rise gradually as a function of the rise of the level of this product in the container. Finally, the rollers 95 and 14 run on the parallel elements 96c and 97c and the pump body rises without causing a relative movement of the piston so as to withdraw completely the tube 20 from the container, during the passage of the rollers on sections 96′c and 97′c of cam members 96 and 97, whereafter the pump body remains constantly in its uppermost position as soon as it has attained the section 96″e.

Each pump must be supplied with an empty container to be filled during the rotation of the pump assembly, this container being removed when filled. Since a vertical movement of translation is applied to the pumps proper it is obvious that during the filling operation the container must remain at a constant level or height, as contrasted with the mode of operation of the structure shown in FIGURES 5 to 14. It is also obvious that the ingress of the containers into the apparatus, as well as the removal thereof, must take place preferably during the time period in which the pumps are in their uppermost position, thus permitting the engagement and disengagement of each container from beneath the relevant dispensing tubes 20 of the apparatus.

FIGURES 15 and 16 illustrate an apparatus provided with a feeding device designed for rigid containers separate from one another, for example yogurt pots.

In this case, the container feeding device comprises essentially a rotary support for the containers which consists of an annular platform 106 secured on the rotary shaft 42 by means of uprights 107. The empty containers travelling for example on a feed conveyor 108a are fed to the platform 106 by an input spider or like device 109a and removed therefrom by an output spider or like device 109b feeding them to a discharge conveyor 108b. The input and output spiders are disposed in the vicinity of the rectilinear cam elements 96a and 96″e corresponding to the uppermost position of the pump bodies and dispensing tubes 20 (see the diagram of FIGURE 19). These spiders are rotatably driven in synchronism with the other component elements of the apparatus, with movements of rotation of same speed but opposite directions.

Each spider, for example the input spider 109a, comprises a base member 110a having mounted for coaxial rotation therein a vertical main shaft 111a rotatably driven from the main driving motor or power unit of the apparatus by means of a pinion keyed on its lower end (not shown). The shaft 111a carries at its upper end a disc, platform or like flange 112a and a drum 113a in the form of an eight-armed spider. The plate 112a of spider 109a or plate 112b of spider 109b are disposed level or substantially level with the platform 106 on the one hand and with conveyors 108a and 108b on the other hand.

Each pot or like container fed by the conveyor 108a nests into the hollow formed between two adjacent arms of the input spider 109a and is carried along by the plate 112a until the corresponding sector of this plate lies under the platform 106. Then the pot is transferred to said platform and is rotatably carried along thereby during the filling operation. When the filling operation is completed, the pot engages the plain, smooth rail 108′b and is thereby transferred to the plate 112b of the output spider which feeds this pot to the discharge conveyor 108b.

FIGURES 20 to 22 illustrate a device for feeding containers made from a flexible material, for example of the type obtained from a plastic strip cut, folded and welded at spaced intervals along lines perpendicular to the fold line and which are partially cut so that the containers are obtained in the form of a continuous string of containers attached to each other in succession due to the presence of a continuous marginal portion left by the partial cutting operation carried out along the weld lines.

In this case the input spider is replaced with a rotary device 114 for driving the strip which comprises a base 115 in which a vertical shaft 116 rotatably driven from the motor of the apparatus by means of a pinion 116a keyed on its lower portion is mounted. This shaft 116 carries at its upper end a variable-diameter drum 117 engaged by a loosely rotating roller 118 carried by a fixed support 119 and urged against the drum 117 by a return spring 120. The plastic or like strip 121 in which the containers 121a, 121b . . . are formed is urged by the roller 118 against the drum 117, thus driving the latter by frictional engagement.

The drum 117 consists of sector-shaped elements 122 mounted for radial sliding movement, these sectors being driven for radial movement by an annular member 123 to which an axial movement is applied. The annular member 123 may be provided to this end with internal threads and engaging a correspondingly screw-threaded sleeve 124 on which a knob 125 is mounted to permit its driving engagement. The rotation of sleeve 124 causes the simultaneous sliding movement by equal amounts of the aforesaid sectors 122. Thus, the diameter of the drum and therefore the linear feed rate of the strip may be adjusted at will. The sectors 122 are lined by a common rubber, plastic or other suitable sheath 126 so as to provide an unbroken surface engageable by the strip 121.

A set of hooks or like members 126 rigid with the uprights of platform 106 and rotatably driven therewith are provided for holding the containers in a vertical position during the filling thereof. Each hook is fulcrumed about a horizontal pivot pin. These hooks are adapted to engage slots left between adjacent containers on the strip in order to hold same during the filling operation.

When the containers are filled with the product they are discharged from the platform 106 by the output spider 109b which transfers them to a welding and cutting device 127.

Of course, many modifications may be brought to the apparatus shown and described herein without departing from the scope of the invention. Thus, for example, the vertical movement of the platforms carrying the container as well as the vertical movement of the pumps could be obtained by using hydraulic, pneumatic or electrical means in lieu of the mechanical means described and illustrated.

Besides, this invention should not be construed as being limited by the specific forms of embodiment shown and described herein, which are given by way of example only.

What we claim is:

1. A metering device for dispensing into containers such as pots, bottles or the like a liquid, fluid, or semifluid product such as milk, yogurt, jam or the like contained in a vat or like vessel provided with a plurality of screw-threaded tubes opening in said vat, comprising a cylindrical vertical body, means for securing said vertical body to one of said screw-threaded tubes, said body having an upper cylindrical chamber coaxial with the body and a cylindrical bore formed in said body above said upper chamber, said bore having a substantially horizontal axis, and being provided with a suction orifice communicating with said upper chamber, a partition wall between said bore and said upper chamber, said partition wall comprising said further orifice, a piston slidably mounted in said upper chamber and provided with an integral downwardly extending rod, a rotatable plug member rotatably mounted in said bore and adapted to put in communication, according to its angular position, either said suction orifice and said further orifice or said further orifice and said delivery orifice, driving means for rotating said plug member, a downwardly extending dispensing tube communicating at the upper end with said delivery orifice and having at its lower end resiliently deformable closing means adapted to open under the pressure exerted by said product and to close in the absence of said pressure, means for reciprocating said piston and said rod, whereby upon synchronous actuation of said reciprocating means and said driving means the product is first drawn from said vat to said cylindrical chamber through said suction orifice and said further orifice and then delivered from said cylindrical chamber to said container through said further orifice, said delivery orifice, said dispensing tube and said closing means.

2. A metering device as claimed in claim 1, wherein said cylindrical body further comprises a lower cylindrical chamber constituting a downward extension for said upper chamber and communicating with the same, said lower chamber being coaxial to said upper chamber, and having an internal diameter substantially greater than the internal diameter of said upper chamber, said lower chamber further comprising parallel longitudinal slots.

3. A metering device according to claim 2, wherein said piston rod is provided with a guide member rigid with said rod and slidably mounted in said lower chamber, said guide member being provided with guide blocks engaging said slots and with a roller emerging from said cylindrical body.

4. A metering device according to claim 1, wherein said cylindrical body further comprises a hollow screw-threaded tip communicating with said suction orifice, the threads of said screw-threaded tip being opposite to the threads of said screw-threaded tube, and a nut having opposite threads, and adapted to be screwed to said tip and to said tube whereby said cylindrical body may be secured in position without having to rotate same about its axis.

5. A metering device as claimed in claim 1, wherein said plug member is provided with a circular groove formed on its outer peripheral surface and wherein a removable lock pin engaging said circular groove is provided for maintaining said plug member in said bore.

6. A metering device as claimed in claim 5, wherein said plug member is provided with an external hub carrying a socket member having externally projecting pins for rotatably driving said plug member in its bore.

7. A metering device as claimed in claim 1, wherein said cylindrical body is provided with securing means for receiving a detachably mounted fastening member carrying said dispensing tube, and with an abutment-forming shoulder.

8. A metering device as claimed in claim 7, wherein said securing means consists of a dovetail joint.

9. A metering device as claimed in claim 8, wherein a variable-length abutment is provided between said fastening member and said vat in order to maintain said fastening member against said shoulder.

10. A metering device as claimed in claim 1, wherein said resiliently deformable closing means comprises a diaphragm made of resilient material and formed with a plurality of mutually engaging lips, each comprising an intermediate slit.

11. A metering device as claimed in claim 1, wherein said dispensing tube is further provided, at its lower end, with an abutment-forming plate.

12. An apparatus for automatically dispensing into containers such as pots, bottles or the like a liquid, fluid or semifluid product such as milk, yogurt, jam or the like comprising a fixed frame structure, a rotatable vertical shaft supported on said fixed frame structure, a vat supported at the upper end of said shaft and containing the product to be dispensed, said vat having a lower or bottom wall provided with a plurality of screw-threaded tubes opening in said vat, a plurality of metering devices secured to said screw-tubes, each metering device comprising a vertical cylindrical body, provided with a cylindrical chamber, a piston slidably mounted in said chamber, a rod rigid with said piston and provided with a guiding member having a roller emerging from said cylindrical body, a bore formed in said body above said cylindrical chamber and having a suction orifice communicating with said vat through said screw-threaded tubes, a delivery orifice and a further orifice communicating with said chamber, a plug member rotatably mounted in said bore and adapted to put in communication according to its angular position either said suction orifice and said further orifice or said further orifice and said delivery orifice, driving means for rotating said plug member, said driving means comprising projecting pins, a dispensing tube communicating with said delivery orifice and provided at its lower end with resiliently deformable closing means adapted to open under the pressure exerted by said product and to close in the absence of said pressure, at least a fixed cam system of generally cylindrical configuration mounted on said frame structure and engaged by said rollers to cause said pistons to reciprocally move in said chamber, fixed stop members engaged by said pins, a retractable stop device normally engaged by said pins to cause said plug member to be rotatably driven, a rotating container feeding device for feeding each container to be filled to one of said metering devices, means for varying and adjusting the vertical relationship between said container and said dispensing tube in order to effect a constant-immersion filling and means for synchronously driving said vertical shaft and said container feeding device in synchronism.

13. An apparatus as claimed in claim 12, wherein said cam system comprises two superposed parallel substantially circular cam members, said cam members being inclined to the horizontal and adapted to be engaged by turns by each roller.

14. An apparatus as claimed in claim 13, wherein each one of said cam members comprises two identical semi-circular elements, the registering ends of said semi-circular elements being provided with complementary beveled junction members, each provided with a hole, the junction members on two registering ends of the semi-circular elements being slidably fitted on a common rod passing through said holes.

15. An apparatus according to claim 14 wherein said semi-circular elements are supported on resiliently mounted supports.

16. An apparatus according to claim 15 wherein each one of said supports comprises a hollow vertical column, a sleeve slidably mounted on said hollow column, clamp members secured on said sleeve, each one of said clamp members carrying a semi-circular element, a stop member at the upper end of said hollow column, a rod slidably mounted within said hollow column, said rod being rigid with said sleeve, a spring within said hollow column for urging said rod against said stop member.

17. An apparatus as claimed in claim 16, wherein said rod comprises a screw-threaded upper extension passing through said stop member and provided with an adjustment nut abutting against said stop member, whereby the position of said sleeve and therefore the inclination of said semi-circular elements may be adjusted vertically by means of said nut.

18. An apparatus as claimed in claim 12, wherein said container feeding device comprises a rotating annular member, a plurality of vertical uprights supported on said rotating annular member, a tubular body slidably mounted on each one of said uprights, a spring within said tubular body for upwardly urging the latter, a plate at the upper end of said tubular body, said plate supporting a container, a roller secured in said tubular body, a generally circular fixed control cam engaged by said rollers, said control cam having a contour designed with a view to control the gradual downward movement of said plates which corresponds to the gradual rise of the level attained by the product in the container in order to effect said constant immersion filling.

19. An apparatus according to claim 12, wherein said retractable stop device comprises a hollow column, an upper sleeve rotatably mounted on said hollow column, a plate rigid with said upper sleeve, a stop member secured in said plate, a rod slidably mounted within said hollow column, means for causing said upper sleeve to rotate upon a vertical displacement of said rod, and control means for controlling the vertical translation of said rod within said hollow column.

20. An apparatus as claimed in claim 19 wherein said control means comprises a lower sleeve slidably mounted on said hollow column and rigid with said rod, and a pedal secured on said lower sleeve and disposed in close vicinity of said control cam, whereby the engagement of said pedal by said rollers causes the rotation of said upper sleeve and said stop member toward a position for which said stop member is not engaged by said pins.

21. An apparatus according to claim 12 comprising a rotatable frame secured on said shaft, a plurality of clamp means on said frame, and vertical uprights slidably mounted in said clamp means, each one of said slidable uprights supporting one of said metering devices.

22. An apparatus according to claim 21, wherein each one of said metering devices is provided with a further roller secured on said cylindrical body.

23. An apparatus according to claim 22 further comprising a further fixed cam system of generally cylindrical configuration mounted on said fixed frame structure and engaged by said further roller, said further fixed cam system having a contour designed with a view to control the gradual upward movement of said metering devices which corresponds to the gradual rise of the level attained by the product in the container in order to effect said constant-immersion filling.

24. An apparatus according to claim 23 wherein said further cam system comprises a plurality of juxtaposed cam elements having various inclinations to the horizontal.

25. An apparatus according to claim 12 wherein said container feeding device comprises an annular platform rigid with said shaft and adapted for receiving said containers, a rotatable input member for engaging said containers on said platform and an output member for removing said containers from said platform, said input and output members being driven in synchronism with said shaft.

26. An apparatus according to claim 12, wherein said container feeding device comprises an annular platform rigid with said shaft and adapted for receiving said containers, a series of hook members rigid with said platform and adapted for maintaining said containers in a vertical poistion, a rotary input device for engaging said containers on said platform and on said hook members, and an output member for removing said containers from said platform and from said hook members, said input device and said output member being driven in synchronism with said shaft.

27. An apparatus according to claim 26, wherein said rotary input device comprising a rotatable vertical shaft, a drum secured on said shaft, a loosely rotating roller and a spring for urging said roller against said drum.

28. An apparatus according to claim 27, wherein said drum comprises a plurality of sector-shaped elements, mounted for radial sliding movement and control means for moving said elements, whereby the diameter of said drum may be adjusted at will.

29. An apparatus according to claim 28, wherein said control means comprises a rotatable screw-threaded sleeve mounted on said vertical shaft and adapted to drive an internally screwed annular member engaging said elements.

References Cited
UNITED STATES PATENTS

| | | | |
|---|---|---|---|
| 1,794,388 | 3/1931 | Mojonnier et al. | 222—380 |
| 1,867,601 | 7/1932 | Stokes | 222—380 X |
| 2,115,335 | 4/1938 | Keck et al. | 141—146 X |
| 2,684,804 | 7/1954 | Huntar et al. | 141—147 X |
| 2,761,605 | 9/1956 | Pahl et al. | 322—380 X |

HOUSTON S. BELL, JR., *Primary Examiner.*